April 28, 1964 P. G. HOLT 3,131,379

ANALOG MEMORY DEVICE USING SLIDABLE MEMORY UNITS

Filed Oct. 18, 1961

INVENTOR.
PLINY G. HOLT

BY [signature]
ATTORNEY 3,131,379

ANALOG MEMORY DEVICE USING SLIDABLE MEMORY UNITS

Pliny G. Holt, Bethesda, Md., assignor to the United States of America as represented by the Secretary of the Navy

Filed Oct. 18, 1961, Ser. No. 146,047
4 Claims. (Cl. 340—173)
(Granted under Title 35, U.S. Code (1952), sec. 266)

The invention described herein may be manufactured and used by or for the Government of the United States of America for governmental purposes without the payment of any royalties thereon or therefor.

The present invention relates to data storage apparatus, and more particularly to data storage mechanical apparatus of the type intended for storing specific values of variable conditions as discrete mechanical positions which can be read out at any later time.

Most data storage devices, or so-called memory devices, known in the prior art and which are suitable for storing or "memorizing" data, are most frequently built for a specific purpose and are very complex in design and construction. Magnetic drums and tapes represent a large segment of this art notwithstanding the complexity of electronic circuits required therefor. Furthermore, the electronic circuits required for storage and read-out are as numerous as there are "memorizing" applications. Very little progress is evident in the field of mechanical-type memory devices, probably because they have heretofore involved complex mechanical elements intricately correlated. Manifestly, they were delicate and often cost- prohibitive. Others of more simplified mechanical construction were coarse and inefficient and produced intolerable discrepancies between the originally stored data and the data as later read out. Mechanical-type data storage devices also have been limited to "memorizing" only a single value of a condition at one time unless its size and complexity was greatly multiplied to accommodate additional values.

Accordingly, it is an object of the present invention to provide a turret-type mechanical data storage device having a plurality of memory cells which are capable of storing a large number of discrete values of variable phenomena for read-out at any later time, which is adapted to receive electrical signals proportional to the state of a variable condition, in which each electrical signal is proportionally translated into a mechanical shaft position in a memory cell, and in which the mechanical shaft position in a selected memory cell can be read out as a proportional electrical signal at any time thereafter.

Another object of the invention is to provide a mechanical data storage device which can readily store any kind of data that is translatable into discrete electrical signals, and in which a large number of data values can be stored at any one time without significantly multiplying its complexity, and in which its construction and manufacture are inherently simple and inexpensive.

A further object of the invention is to provide a mechanical data storage device in which "memorized" data is automatically removed from a memory cell by the storing of new data in the same cell, and in which any selected memory cell is positively maintained for storage or read-out until manually repositioned.

Still another object of the invention is to provide a relatively simple and inexpensive memory device having wide application and utility, which is reliable and rugged in construction, and which will provide highly accurate read-out of stored data.

Various other objects and advantages will appear from the following description of one embodiment of the invention, and the most novel features will be particularly pointed out hereinafter in connection with the appended claims.

Figure 2:
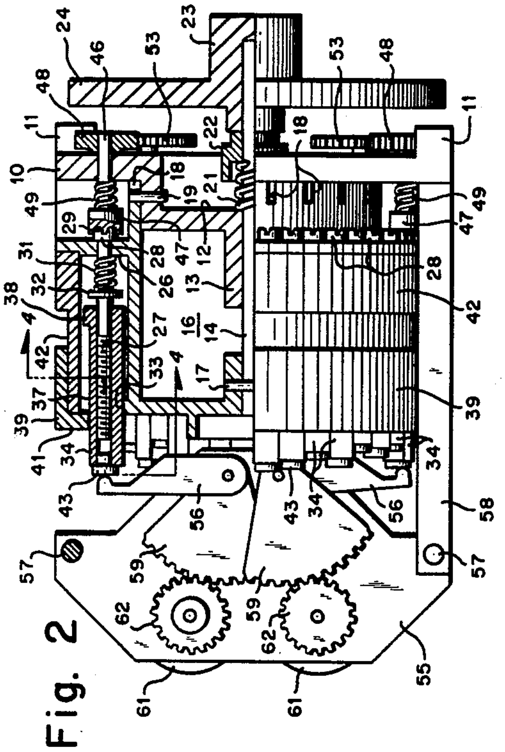
FIG. 2 represents a side view of the data storage device illustrated in FIG. 1 partially in cross section as taken along the line 2—2.

In the illustrated embodiment of the invention, the data storage device includes a rectangular front mounting plate 10 which is adapted to be secured on rigid supporting structure, such as an instrument panel, by screws in the threaded bosses 11 at each corner. A portion of the mounting plate 10 is rearwardly offset forming thereby a cylindrical well 12 and an axial extension 13. The extension 13 is drilled through along the cylindrical axis to form a journal for a drum shaft 14. The rear end of the shaft 14 is coaxially fixed to the rearward closed end of a cylindrical drum indicated generally by the numeral 16, by a pin 17 so that the shaft 14 and drum 16 move concomitantly. The drum 16 is open at its forward end and proportioned so that it is slidable on the outer surface of the mounting plate 10 which defines the well 12. The shaft 14 extends forwardly beyond the mounting plate 10. The forward circumferential edge of the drum 16 defines nineteen equally spaced longitudinal slots or grooves 18 each of which is slidable on a drum detent 19 fixed on the outer surface of the well 12. Each slot 18, when registered with the detent 19, therefore determines an indexed position for the drum 16. The number of positions, of course, are a matter of choice, and may be selected to suit conditions or to meet specifications. The slots 18 are of sufficient depth to assure that the forward edges between the slots 18 abut the non-offset portion of the mounting plate 10 around the well 12 when the drum is in an indexed position.

The drum 16 is urged forwardly into any indexed position by a drum compression spring 21 helically wound about the forward extension of thte shaft 14 and retained between the mounting plate 10 and a spring retainer 22, the latter being fixed to the shaft 14. An indexing knob 23, also fixed at the forward extremity of the shaft 14, provides a convenient means for manually urging the shaft rearwardly against the compression of the spring 21 and for rotating the shaft 14 and drum 16 when none of the slots 18 are engaging the detent 19. A dial 24 formed by a flanged portion of the knob 23 is inscribed on its forward face with radial lines 25 defining equiangular sections each of which corresponds to an indexed position of the drum 16. The segments provide sufficient blank space for notations that would identify the particular data stored at each indexed position. A fixed pointer, not shown, is inscribed in the front of the instrument panel adjacent to the outer periphery of the dial 24 to indicate the indexed position of the drum 16 at all times.

Disposed near the forward end of the drum 16 is an annular flanged portion 26 in which thirty-eight memory cap screws 27 are journaled in an equal-spaced annular array with their longitudinal axes parallel to the cylindrical axis of the drum 16. The forward end of each screw 27 terminates with a flat head 28 having a diametrical, tapered groove 29; and each screw 27 is threaded along a rear portion of its length. Each cap screw 27 is urged rearwardly by a compression spring 31, helically wound about the cap screw 27 between the flanged portion 26 and a collar 32 fixed on the screw 27, until the head 28 abuts the flanged portion 26.

Figure 3:
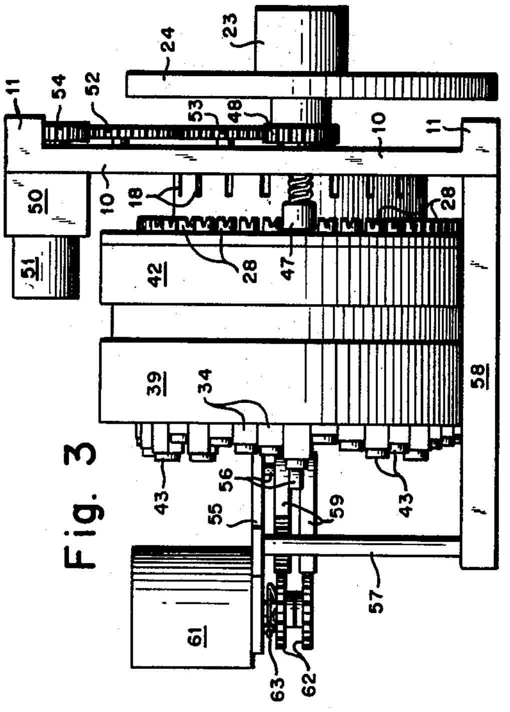
FIG. 3 represents a top view of the data storage device illustrated in FIG. 1.
Figure 1:
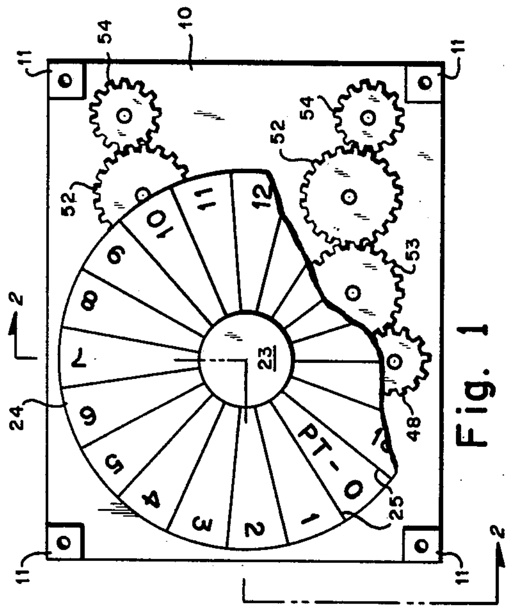
FIG. 1 represents a front end view of a mechanical data storage device constructed according to the invention.
Figure 4:
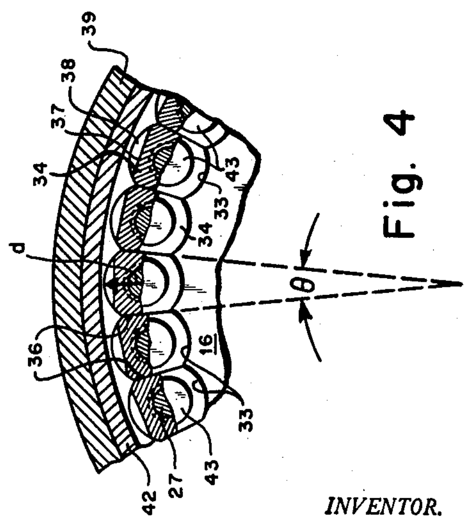
FIG. 4 represents a fragmentary cross-sectional view of the data storage device as taken along the line 4—4 of FIG. 2.

Disposed near the rear end of the drum 16 is another annular flange in which there are thirty-eight grooves 33 containing thirty-eight elongated memory nuts 34, each respectively coaxial with a cap screw 27 and slidable endwise relative to its groove 33. Each nut 34 is also threaded throughout its length and engages the threaded portion of its correspondingly aligned screw 27. FIG. 3, which is a fragmentary end view partially in cross section of several of the memory nuts 34, illustrates the manner in which the nuts 34 are arranged relative to each other around the drum 16. Each nut 34 is basically a cylinder having an outer diameter $d$, and is machined along its length to form two flat sides 36 defining radial planes angularly displaced by an angle $\theta$. The angle $\theta$ has its apex on the cylindrical axis of the drum 16 and is equal to $360/n$, where $n$ is the number of nuts 34 in the array. In the illustrated embodiment of thirty-eight memory nuts 34, $\theta$ is approximately 9.5 degrees. It is now apparent that when the nuts 34 are juxtaposed about the drum 16 in a complete array, each nut 34 is prevented from rotating about its longitudinal axis by the contact between the confronting flat sides of adjacent nuts 34. Hence, when any one of the screws 27 is turned about its axis, the corresponding nut 34 slides forward or rearward accordingly. Each memory nut 34 is also machined flat along a rearward portion of its length to form an outer flat surface 37 and a curved shoulder 38 at the forward end thereof. The shoulder 38 abuts a lip portion 41 of a nut retaining ring 39 when any nut 34 travels rearwardly thereby stopping it from becoming completely disengaged from the screw 27. Forward travel of the nuts 34 is limited by the position of the collar 32 along the screw 27. The ring 39 is fixed to the drum 16 and positioned about the nuts 34 by means of a cylindrical stand-off sleeve 42 secured at its forward end to the flanged portion 26. The flip portion 41 slidably engages the flat surfaces 37 to retain the nuts 34 in the grooves 33. Plugs 43, press-fitted in the rear openings of the nuts 34, provide a camming surface to be described herein.

In any indexed position of the drum 16, two diametrically opposite screws 27 are always respectively coaxial with the screw drivers 46 which are slidably and rotatably journaled in the nonoffset portion of the mounting plate 10. The rear of each screw driver 46 includes a socket 47 in which the wedge-shaped end is disposed for registering with the flat head 28 and groove 29 of the aligned screw 27. The forward end of each screw driver 46 extending beyond the forward side of the mounting plate 10 includes a driven gear 48 fixed thereto. The gears 48 are urged rearwardly by a helical spring 49 that is maintained in compression between the socket portion 47 and the mounting plate 10. When the drum 16 is moved rearward from the position shown, rearward travel of the screw drivers 46 are limited by the contact of the driven gears 48 with the mounting plate 10. Rearward travel is otherwise limited by registration of the wedge-shaped ends of the screw drivers 46 with the flat heads 28 and grooves 29. The total force of the springs 49 must be light relative to the force of the spring 21 to insure that the indexed slot 18 completely registers with the drum guide detent 19.

Each driven gear 48 is rotated in either direction by a reversible servo motor 51 through a speed-reduction box 50 and a train of gears 52, 53 and 54 which are rotatably supported on the non-offset portion of the mounting plate 10. The gear 54 must be sufficiently wide that the driven gear 48 will remain meshing therewith for the maximum axial travel of the screw driver 46.

Follow-up of the servo motors 51 and read-out of the axial position of any memory nut 34 is accomplished through a pair of levers 56 which are pivotally connected at one end of each to an auxiliary mounting plate 55. The auxiliary plate 55 is fixed rearwardly of the drum 16 by a pair of vertical and parallel spacer bars 57 which in turn are respectively supported rearwardly from the mounting plate 10 by a pair of horizontal and parallel beams 58. The pivoted end of each lever 56 has a gear sector 59 fixed thereto for rotation therewith and is drivingly connected to a transducer 61 through a pinion 62. The free ends of the levers 56 are continuously urged against the respective plugs 43 of the diametrically opposite nuts 34 of any index position of the drum 16 by a spiral spring 63 which is connected between the auxiliary mounting plate 55 and the pinion 62. The selection of particular types of servo motors 51 and transducers 61 for obtaining angular shaft positions proportional to electrical input signals and electrical output signals proportional to angular shaft positions at the input, respectively, will depend upon the character of the electrical signals and the follow-up circuits employed. Such a selection, of course, is not regarded as crucial to the fundamental inventive concept herein disclosed and claimed. It should also be apparent that the illustrated embodiment provides for simultaneously recording or reading out two separate and distinct values of data by virtue of the duality of recording and read-out elements. The invention, however, is not intended to be thus limited. For example, only one set of recording and read-out elements may be presented with as many indexed positions on the drum 16 as there are memory nuts 34.

The mode of operation of the data storage device should now be apparent. Assume that two values of data which have been translated into appropriate electrical signals are available for applying to the inputs of the servo motors 51. A pair of diametrically opposite memory nuts 34 are selected as memory cells by manually pressing the index knob 23 rearwardly against the force of the spring 21 until the slots 18 on the forward end of the drum 16 are completely disengaged from the drum detent 19. The grooves 29 in the memory screws 27 also completely disengage from the screw drivers 46. The knob 23 is now rotated to a segment of the dial 24 relative to the fixed pointer on the instrument panel, not shown, which segment represents a particular pair of memory cells. The knob 23 is then released at the selected segment and the drum 16 moves forwardly due to the force of the spring 21 until the indexed slot 18 completely registers with the detent 19. Simultaneously the screw 27 will engage the screw driver 46. Since the wedge-shaped edge in the socket 47 will not necessarily align with the groove 29 in the head 28, the outer end of the wedge-shaped edge may simply abut the head 28 to cause the screw driver 46 to move further forward therewith without registering in the groove 29. This is only a temporary condition which is automatically removed within the first one-half revolution of the screw driver 46. It will be observed that, during forward and backward motion of the drum 16 at any indexed position, the final shaft positions of the transducers 61 were not disturbed. This is due to the continuous contact maintained between the transducers 61 and the plugs 43 by the spring 62 and lever 56.

The electrical signals are now connected to the servo motors 51 which cause the screw drivers 46 to turn. By a feed-back circuit means, not shown, the transducers 61 are respectively connected to the servo motors 51 so that the memory nuts 34 will travel only a discrete amount proportional to the electrical input signal to the motors 51. One such circuit will cause the servo motors 51 to continue to drive the screw drivers 46 until the transducers 61 have been rotated a sufficient amount to rebalance or offset the electrical signals at the input to the motors 51. The information is thus recorded into "memory." Captions may be written in the respective segments on the dial 24 indicating the character of the data stored thereat.

Read-out of the data storage device simply involves rotating the index knob 23 to the desired segment in the manner described above, and observing the electrical output singal produced by the transducers 61. By circuit means, not shown, the motors 51, of course, are disconnected and the screw drivers 46 are inoperative.

Among the many advantages of the present invention, it should be now apparent that a plurality of discrete values of variable phenomena may be conveniently recorded and "memorized" in a turret-type storage device which is manually indexed to one or more memory cells. The "memorized" signals are automatically erased by simply applying a new data into storage. The "memorized" data can be read out at any convenient time thereafter.

It will be understood that various changes in the details, materials, steps and arrangement of parts, which have been herein described and illustrated in order to explain the nature of the invention, may be made by those skilled in the art within the principle and scope of the invention as expressed in the appended claims.

What is claimed is:

1. A turret-type mechanical data storage device for selectively storing and reading out a plurality of discrete values of variable conditions, comprising: a front plate adapted to be mounted on a rigid panel, a storage drum rotatably connected to said plate on an axis normal thereto, a plurality of slots spaced around the forward circumferential edge of said drum, a detent fixed to said plate in a position for engaging any one of said slots thereby determining a plurality of discrete angular positions of said drum about its axis relative to said mounting plate, force-exerting means operatively connected between said drum and said plate for urging said drum forward to engage any one of said slots with said detent, a plurality of elongated memory nuts positioned in a coaxial annular array parallel to each other around said drum at angular intervals corresponding to the angular positions of said drum, a plurality of screws each threadingly engaged in each of said nuts for linearly adjusting said nuts in a direction parallel to the drum axis in accordance with rotation of said screws, shaft means connected to said drum formed for disengaging said slots and said detent and for manually indexing said drum to any of its angular positions, screw driver means rotatably supported by said plate and operatively connected to one of said screws when said drum is indexed to its corresponding angular position for changing the linear position of said nut, servo motor means secured on said plate and drivingly connected to said screw driver means for operating the latter in response to an electrical signal indicative of the value of a variable condition, lever means pivotally connected to said plate with its free end registering with said one nut for translating the linear position of said one nut to an angular position of said lever means, force-exerting means operatively connected between said plate and said lever means for urging the free end of said lever means against said one nut, transducer means secured to said plate for producing an electrical signal proportional to the angular position of its shaft, and gear means drivingly connected between the shaft of said transducer means and said lever means.

2. A turret-type mechanical data storage device for selectively storing and reading out a plurality of discrete values of variable phenomena, comprising: a front plate adapted to be mounted on a rigid panel, a storage drum rotatably connected to said plate, detent means operatively connected between said drum and said plate for determining a plurality of discrete angular positions of said drum about its axis relative to said mounting plate, an annular array of parallel memory cells positioned around said drum at angular intervals corresponding to the angular positions of said drum, said cells being linearly adjustable in a direction parallel to the drum axis, shaft means connected to said drum formed for manually indexing said drum to any of its angular positions, adjusting means supported by said plate and operatively connected to one of said memory cells when said drum is indexed to its corresponding angular position for changing the linear position of said cell, servo motor means secured on said plate and drivingly connected to said adjusting means for operating the latter in response to an electrical signal indicative of the value of a variable phenomenon, lever means pivotally connected to said plate with its free end registering with said one cell for translating the linear position of said cell to an angular position of said lever means, force-exerting means operatively connected between said plate and said lever means for urging the free end of said lever means against said one cell, transducer means secured to said plate for producing an electrical signal proportional to the angular position of its shaft, and gear means drivingly connected between the shaft of said transducer means and said lever means.

3. A memory device for simultaneously storing and reading out of a plurality of separate and distinct values of variable conditions, comprising: support means, drum means rotatably connected to said support means and adapted to be manually rotated, a plurality of memory cells slidably connected around said drum means at spaced intervals and linearly adjustable to an infinite number of positions in a direction parallel to the rotation axis of said drum means, a plurality of adjusting means connected to said support means and each simultaneously connected to selected cells of said plurality of memory cells by rotating said drum means for changing the linear position of said selected cells, a plurality of motor means secured on said support means and each drivingly connected to said plurality of adjusting means for operating the latter in response to separate and distinct electrical input signals, a plurality of transducer means secured to said support means operatively connected to said selected cells for producing separate and distinct electrical signals proportional to the linear positions of said selected cells.

4. A memory device for simultaneously storing and reading out a plurality of separate and distinct values of variable conditions, comprising: support means, drum means rotatably connected to said support means, a plurality of memory cells linearly adjustable to an infinite number of positions connected around said drum means, a plurality of adjusting means each simultaneously connected to selected cells of said plurality of memory cells by rotating said drum means for changing the linear position of said selected cells, a plurality of motor means each connected to said plurality of adjusting means for operating the latter in response to separate and distinct electrical input signals, a plurality of transducer means operatively connected to said selected cells for producing separate and distinct signals proportional to the linear positions thereof.

References Cited in the file of this patent

UNITED STATES PATENTS

| | | |
|---|---|---|
| 1,295,167 | Hollerith | Feb. 25, 1919 |
| 2,217,342 | Ladrach | Oct. 8, 1940 |
| 2,424,322 | Luhn | July 22, 1947 |
| 2,601,154 | Krueger et al. | June 17, 1952 |
| 2,755,023 | Cooper et al. | July 17, 1956 |